United States Patent [19]
Green et al.

[11] Patent Number: 5,378,256
[45] Date of Patent: Jan. 3, 1995

[54] METHOD OF MANUFACTURING SILICA WAVEGUIDE OPTICAL COMPONENTS

[75] Inventors: Mino Green; R. R. A. Syms; Andrew S. Holmes, all of London, United Kingdom; Ken Ueki; Hisaharu Yanagawa, both of Tokyo, Japan

[73] Assignee: The Furukawa Electric Co., Ltd., Tokyo, Japan

[21] Appl. No.: 78,424

[22] Filed: Jun. 16, 1993

[30] Foreign Application Priority Data

Jun. 16, 1992 [JP] Japan ................... 4-156598

[51] Int. Cl.⁶ ............... C03C 25/02; C03B 37/023
[52] U.S. Cl. ........................ 65/395; 65/444; 65/60.52; 501/12
[58] Field of Search .............. 65/3.11, 3.12, 18.1, 65/60.52; 501/12

[56] References Cited

U.S. PATENT DOCUMENTS

| | | | |
|---|---|---|---|
| 4,816,049 | 3/1989 | Hata et al. | 65/60.52 X |
| 5,108,479 | 4/1992 | Hirano | 65/60.52 |
| 5,143,533 | 9/1992 | Brusasco | 65/18.1 |

FOREIGN PATENT DOCUMENTS

| | | | |
|---|---|---|---|
| 56-114904 | 9/1981 | Japan | 65/901 |
| 61-91020 | 5/1986 | Japan | 65/901 |

*Primary Examiner*—Robert L. Lindsay
*Attorney, Agent, or Firm*—Frishauf, Holtz, Goodman & Woodward

[57] ABSTRACT

This invention describes a method of manufacturing silica waveguide optical components in which silica glass films are laminated on a substrate by repeating a unit operation in which a sol material, a precursor of glass particles, is coated and then the coated layer is heated in an oxygen atmosphere. wherein the heating temperature is controlled in such a manner that the radius of curvature of warping of the substrate is 2 m or more after the coated layer is heated, thereby preventing cracking in the formed silica glass film and/or peeling of the coated layer. At locations where a difference in height is present, at least when sol is coated first time, the thickness of the coated layer is less than that of one of the subsequent coated layers.

6 Claims, No Drawings

METHOD OF MANUFACTURING SILICA WAVEGUIDE OPTICAL COMPONENTS

BACKGROUND OF THE INVENTION

1. Field of the Invention

The present invention relates to a method of manufacturing silica waveguide optical components and, more particularly, a method of manufacturing silica waveguide optical components in which peeling and/or cracking of coated films does not occur in forming a waveguide by laminating silica glass films using the sol-gel method.

2. Description of the Prior Art

In the field of optical communication, as the introduction of optical fibers to the communication system for prospective subscribers increases, silica waveguide optical components composed of materials having the same quality as those of the existing optical fibers are of great importance.

These silica waveguide optical components are generally manufactured as described below. First, the method of manufacturing an optical component having a slab waveguide will be described.

A silica glass film whose substantial ingredient is $SiO_2$ and which has a specified film thickness and a specified refractive index is formed as a lower cladding layer on a substrate having a specified thickness which consisting of, for example, single crystal Si.

Next, a silica glass film, in which a specified quantity of, for example, $TiO_2$ is doped in $SiO_2$ and which has a refractive index higher than that of the lower cladding layer, is coated as a core slab layer on the lower cladding layer. Then, a silica glass film of the same material as that of the lower cladding layer, which has a specified thickness and a specified refractive index, is coated as an upper cladding layer on the core slab layer. Thus, a slab waveguide optical component is provided which is so constructed that a slab-shaped core layer for light propagation is sandwiched between upper and lower cladding layers.

For an optical component having buried channel waveguides, the aforesaid core slab layer is formed, and thereafter unnecessary portions of the core slab layer are etched off by employing the photolithography method with the reactive ion etching technique to form channel waveguide cores spreading on the lower cladding layer with a specified plane pattern. Then, the aforesaid channel waveguide cores are covered with a silica glass film as an upper cladding layer. Thus, an optical component with a buried channel waveguide pattern is manufactured.

In both cases, the coating of silica glass films on the substrate is an indispensable process in manufacturing the above-described silica waveguide optical components.

In this case, the available methods of manufacturing aforesaid silica glass films include the flame hydrolysis deposition method, the plasma CVD method, the electron-beam evaporation method, and the sol-gel method. Among these methods, the sol-gel method has attracted considerable attention because the silica glass films can be produced by simple apparatuses with this method.

The sol-gel method is generally applied as described below.

First, a precursor sol of silica such as $Si(OC_2H_5)_4$, which is the precursor sol of the substantial ingredient compound, is diluted by a solvent such as ethanol to prepare a sol for cladding layers whose viscosity is controlled appropriately. When a core layer is formed, a sol for the core layer is prepared in which a specified amount of a precursor sol of titania such as $Ti[OCH(CH_3)_2]_4$ is mixed into the aforesaid sol for the cladding layers.

Next, a coated layer of a desired thickness is formed on, for example, a single crystal Si substrate, applying the aforesaid sol for cladding layer, using the spin coating method or dipping method. In the coating process using the spin coating method, the solvent of the sol volatilizes to provide gelation partially. Also, using the dipping method, the entire of coated layer is gelled by heating the coated layer at a relatively low temperature to accelerate the volatilization of solvent.

Afterward, the coated layer is heated usually at a temperature of 1000° C. or higher in an oxygen atmosphere to sinter the gel of the coated layer, thereby transparent silica glass film being provided.

After a coated layer is formed by applying the sol again on the silica glass film formed by the aforesaid operation, sintering is carried out again, so that the second layer of silica glass film is laminated on the aforesaid first layer of the silica glass film.

The operation consisting of the formation of coated layer and sintering of the layer is repeated the specified number of times, and finally, the lower cladding layer having a specified thickness is formed.

For the core layer and the upper cladding layer, the silica glass film for each layer having a desired thickness can be formed by repeating the above-described operation.

In the above-described sol-gel method, the maximum film thickness of silica glass film formed by one unit operation consisting of the coating of sol and the consolidation of the coated layer, is about 0.7 $\mu$m. In general, however, by one unit operation, the upper limit of film thickness for pure $SiO_2$ laminated film is about 0.2 $\mu$m, whereas that for $TiO_2$ doped $SiO_2$ laminated film with $TiO_2$ concentration of 6.25 mol % is about 0.24 $\mu$m.

When a silica glass film of a total thickness of 1 $\mu$m or more is to be formed, therefore, it is necessary to repeat more than ten times the unit operation consisting of the coating of sol and the sintering of the coated layer.

However, when the unit operation consisting of the coating of the sol and the sintering of the coated layer is repeated about ten times, the silica glass film formed by the sol-gel method generally poses problems frequently in that cracks are formed in the film and/or peeling of the coated film occur. As a result, the yield in manufacturing lowers significantly.

In the case where the aforesaid buried channel waveguide optical components are manufactured, if the sol-gel method is used in forming the upper cladding layer to bury the channel waveguide pattern formed on the lower cladding layer, a coated layer having a uniform thickness throughout the entire surface of the channel waveguide pattern cannot be formed because the surface to which sol for cladding layer is applied is not flat due to the protrusive channel waveguide pattern having been formed on the surface of the lower cladding layer. For example, a relatively large amount of sol is applied to a concave portion that is formed by the side walls of the protruding channel waveguide pattern and the surface of the lower cladding layer, by which the thickness of the coated layer as a whole becomes relatively thick at locations along the protrusive channel waveguide pattern.

Therefore, if heating for consolidation of the coated layer is performed, after the unit operation consisting of the coating of the sol and the sintering of the coated layer is repeated one to several times likewise, cracking and/or peeling of the coated layer occurs at the portion of the upper cladding layer along the channel waveguide pattern, by which the yield is significantly lowered likewise.

OBJECT OF THE INVENTION

An object of the present invention is to provide a method to prevent cracking and/or peeling of the coated layer in manufacturing silica waveguide optical components by the sol-gel method.

To achieve the above object, the present invention provides a method of manufacturing silica waveguide optical components in which silica glass films are laminated on a substrate by repeating a unit operation in which a sol material, a precursor of glass particles, is coated and then the coated layer is sintered in an oxygen atmosphere, wherein the heating temperature is controlled in such a manner that the radius of curvature of warping of the substrate is 2 m or more after the heating.

Also, the present invention provides a method of manufacturing silica buried channel waveguide optical components in which an upper cladding layer for burying a channel waveguide pattern is formed by repeating a unit operation in which a sol material, a precursor of glass particles, is coated on the channel waveguide pattern formed on a lower cladding layer already formed with a difference in height and then the coated layer is heated in an oxygen atmosphere, wherein the coated layer is formed so that the upper layer is at least thicker than the lower layer, and the heating temperature is controlled in such a manner that the radius of curvature of warping of a substrate is 2 m or more after the heating.

DETAILED DESCRIPTION OF THE INVENTION

The fact that cracking in the silica glass film and/or peeling of the film are found when a unit operation consisting of the coating of sol and the heating of the coated layer is repeated about ten times in the sol-gel method is thought to be caused by the following: When the coated layer which has been formed as gel is heated, a stress is generated in the film by shrinkage in the process in which the gel is sintered, or a stress is generated in the film by the difference in thermal expansion between the substrate and a silica glass film of some thickness which has already been formed on the substrate.

Accordingly, the inventors formed the aforesaid coated layer on a single crystal Si substrate, and then heated it at various temperatures for consolidation. As a result, the following facts were found: When the coated layer is heated at a temperature in a consolidation temperature range ($T_1$) higher than a temperature (T), the substrate is warped in a convex form with the formed silica glass film side being upward. When the coated layer is heated at a temperature in a consolidation temperature range ($T_2$) lower than a temperature (T), the substrate is warped in a concave form with the formed silica glass film side being upward. When the coated layer is heated at a temperature approximate to T, the warping of the substrate is hardly recognized.

This means that a compressive stress is generated as a whole inside the formed silica glass in the former heating treatment ($T_1 > T$) and a tensile stress is developed as a whole in the latter heating treatment ($T > T_2$), consequently, the warping being generated.

If the coated layer is heated at the foregoing moderate temperature (T), therefore, the compressive and tensile stresses are balanced. This eliminates the occurrence of cracking in the silica glass film and/or peeling of the film.

For this reason, according to this invention, the temperature for heating the coated layer in a unit operation is determined in such a manner that inner stresses are not generated in the formed silica glass film on an average. More specifically, the temperature is determined in such a manner that the warping of the substrate is not generated.

If the heating temperature is about 1075° C., the cracking in the silica glass film and/or the peeling of the coated film occurs, though the temperature varies depending on the composition of gel composing the coated layer or the like.

For example, when the Si substrate has a thickness of 500 $\mu$m, significant internal stresses are not generated on an average in the formed silica glass film if the warping of the substrate, even if being generated, has a radius of curvature of 2 m or more. Therefore, the cracking in the silica glass film and/or peeling of the film does not occur. The temperature range for restricting the warping of the substrate to the above range is the temperature (T) at which the warping is not generated plus or minus 100° C.

Therefore, when the substrate has a thickness of 500 $\mu$m, it is preferable to set the heating temperature according to the present invention to 1075°±100° C.

If the thickness of the substrate is increased to, for example, 750 $\mu$m or more, the warping of the substrate after heating can be reduced. Thus, the use of thick substrate can relax the temperature control in heating the coated layer. For example, the thickness of the Si substrate of 1000 $\mu$m widens the heating temperature range to 1075°±150° C.

In forming buried channel waveguides, when the channel waveguide pattern protruding from the surface of the lower cladding layer, which has already been formed, is buried with the upper cladding layer, the thickness of the coated layer is increased sequentially in addition to controlling the heating temperature so that the warping of the substrate has a radius curvature of 2 m or more after heating, i.e., so that internal stresses are not generated on an average in the sintering process of the coated layer.

By decreasing the thickness of the coated layer as compared with that of its upper layer, the following advantage is provided:

When the lowermost coated layer is formed, a relatively large amount of sol is applied at the concave portion formed by the side walls of channel waveguide pattern and the surface of lower cladding layer. If the sol is applied in such a manner that the normal thickness of coated layer is provided, the thickness of the coated layer at this portion becomes too great, thereby cracking occurring in sintering. In the present invention, therefore, the thickness of the coated layer at the concave portion is decreased to the extent that cracking is not formed, by decreasing the thickness of the coated layer. As a result, the occurrence of cracking is prevented. By repeating a unit operation consisting of coating and sintering, the channel waveguide pattern is gradually buried, and the difference in height at the concave portion is gradually decreased, by which the thickness of coated layer at the concave portion is decreased. Accordingly, when sol is coated on the upper cladding layer to be formed, the thickness of the coated layer is increased as a unit operation consisting of coating and sintering is repeated, by which the speed of work can be increased while the occurrence of cracking at the concave portion is inhibited. Specifically, the thickness of at least the first coated layer is decreased by decreasing the viscosity of sol coated over the channel waveguide pattern or increasing the rotational speed of the substrate in the spin coating method. This makes comparatively uniform the thickness of the coated layer formed near the side walls of the channel waveguide pattern and the thickness of the coated layer formed on the surface other than the channel waveguide pattern, i.e., the surface of the lower cladding layer. Therefore, the problem of occurrence of cracking in the coated film and/or peeling of the coated film in consolidation is solved to some degree.

In addition, by repeating the above treatment desired times, the difference in height between the lower cladding layer and the channel waveguide pattern is sequentially decreased and the entire surface is flattened, thereby the productivity in manufacturing being improved.

EXAMPLE 1

$Si(OC_2H_5)_4$ of 99.99% purity was diluted with ethanol at a volume ratio of 1:1, with which hydrochloric acid solution of 0.1 mol % concentration was mixed in such a manner that the mol ratio of water to $Si(OC_2H_5)_4$ was 1:1. The mixture was refluxed at 70° C. for 2 hours for hydrolysis, producing sol for glass source.

Similarly, $Ti[OCH(CH_3)_2]_4$ of 99.99% purity was diluted with ethanol at a volume ratio of 1:1, producing sol for dopant.

By adding the sol for dopant to the sol for glass source, sol (1) and sol (2) with a $TiO_2$ concentration of 6.25 mol % and 7.5 mol %, respectively, were prepared. A unit operation consisting of coating and heating was performed 100 times by using sol (1) on the surface of single crystal Si substrate having a pure surface and a thickness of 500 μm by using sol (1) to form a buffer layer with a thickness of about 20 μm and a refractive index of about 1.48. Then, a unit operation consisting of coating and heating was performed 33 times by using sol (2) to form a core layer with a thickness of about 8 μm and a refractive index of about 1.49. The buffer layer and the core layer had no cracking and peeling, each forming a transparent integral glass layer.

Each sol was coated by the spin coating method of a rotational speed of 1000 rpm, and heating was carried out at 1075° C. in the oxygen atmosphere.

The obtained substrate warped with the glass film being upward, but its radius of curvature was about 3 m.

Further, each coated layer was heated at 1180° C. and 970° C. In either case, fine cracks were found in coated layer when a unit operation consisting of the formation of coated layer and the consolidation was repeated 10 times. The warping of the substrate had a radius of curvature of about 2 m in either case.

EXAMPLE 2

A buffer layer and a core layer were formed in the same way as that of Example 1 except that the thickness of single crystal Si substrate was 1000 μm and the heating temperature of sol applied to the coated layer was 1175° C. Neither layer had no cracking and peeling. The warping of the substrate had a radius of curvature of about 3 m, which was similar to that in Example 1.

Additionally, the occurrence of cracking was investigated by changing the heating temperature. When the heating temperature is out of range of 1075°±150° C., a crack began to be formed at the time when a unit operation consisting of the formation of coated layer and the heating was repeated about 10 times.

EXAMPLE 3

A 30 μm thick lower cladding layer and a 8 μm thick core slab layer were formed on a 1000 μm thick single crystal Si substrate by the sol-gel method, which was similar to that of Example 1.

Then, a ridge-shaped channel waveguide pattern with a width of 8 μm and a height of 8 μm was formed by carrying out the photolithography method using the reactive ion etching technique on the core slab layer.

The sol of glass source of Example 1 was diluted with ethanol to reduce its viscosity, and coated onto the channel waveguide pattern by the spin coating method as with Example 1. Then, the coated layer was heated at 1075° C. to form a silica glass film of about 0.1 μm in thickness.

By repeating this operation, the upper cladding layer was let grow up to about 2 μm in thickness. At this time, the difference in height of the upper cladding layer formed on the channel waveguide pattern was small, the whole surface being flat to some degree.

Next, the thickness of glass film formed by one cycle of coating and heating was set at about 0.15 μm by somewhat increasing the viscosity of sol used, so that the whole upper cladding layer grew up to 10 μm in thickness. In this case, there was hardly a difference in height of the upper cladding layer formed on the channel waveguide pattern, the whole surface being substantially flat.

Succeedingly, the thickness of glass film formed by one cycle of coating and heating was set at about 0.2 μm by further increasing the viscosity of sol used, so that the whole upper cladding layer grew up to 20 μm in thickness to produce a buried waveguide optical component. In this case, neither cracking nor peeling of the coated film was found in respective silica glass film in the lower cladding layer, channel waveguide pattern, and upper cladding layer.

As described above, according to the present invention, a thick silica glass film requiring at least 50 unit operations consisting of coating of sol and heating of the coated layer can be formed by the sol-gel method. Moreover, the heating temperature control for consolidation of the coated layer can be relaxed by increasing the thickness of the substrate.

What is claimed is:

1. A method of manufacturing silica waveguide optical components in which silica glass films are laminated on a substrate by repeating a unit operation in which a sol material, a precursor of glass particles, is coated and then the coated layer is heated in an oxygen atmosphere, wherein the heating temperature is controlled in such a manner that the radius of curvature of warping of said substrate is 2 m or more after said coated layer is heated.

2. The method of manufacturing silica waveguide optical components according to claim 1 wherein said heating temperature is controlled to be 1075°±100° C.

3. A method of manufacturing buried silica waveguide optical components in which an upper cladding layer for burying a channel waveguide pattern is formed by repeating a unit operation in which a sol material, a precursor of glass particles, is coated on said channel waveguide pattern formed on a lower cladding layer already formed on a substrate with a difference in height and then the coated layer is heated in an oxygen atmosphere, wherein said coated layer is formed so that at least when sol is coated first time, the thickness of the coated layer is less than that of one of the subsequent coated layers, and the heating temperature is controlled in such a manner that the radius of curvature of warping of said substrate is 2 m or more after said coated layer is heated.

4. The method of manufacturing buried silica waveguide optical components according to claim 3 wherein said heating temperature is controlled to be 1075°±100° C.

5. The method of manufacturing buried silica waveguide optical components according to claim 3, wherein said substrate has a thickness of 750 μm or more and said heating temperature is controlled to be 1075°±150° C.

6. The method of manufacturing silica waveguide optical components according to claim 1, wherein said substrate has a thickness of 750 μm or more and said heating temperature is controlled to be 1075°±150° C.

* * * * *